(12) United States Patent
Benning et al.

(10) Patent No.: US 8,104,955 B2
(45) Date of Patent: Jan. 31, 2012

(54) ASPIRATED ENHANCED TOTAL AIR TEMPERATURE PROBE

(75) Inventors: Kevin J. Benning, Lakeville, MN (US); Charles R. Willcox, Eden Prairie, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 12/892,154

(22) Filed: Sep. 28, 2010

(65) Prior Publication Data

US 2011/0013664 A1    Jan. 20, 2011

Related U.S. Application Data

(62) Division of application No. 11/747,974, filed on May 14, 2007, now Pat. No. 7,828,477.

(51) Int. Cl.
*G01K 13/02* (2006.01)
*G01F 1/00* (2006.01)

(52) U.S. Cl. ........ 374/141; 374/135; 374/138; 374/143; 374/163; 374/208

(58) Field of Classification Search .............. 374/100, 374/109, 134, 141–143, 147–148, 40, 44, 374/208, 163, 183, 166, 110–115, 29, 144; 73/170.02, 204.22
See application file for complete search history.

(56) References Cited

U.S. PATENT DOCUMENTS

| | | |
|---|---|---|
| 2,970,475 A | 2/1961 | Werner |
| 3,167,960 A | 2/1965 | Miesiak |
| 3,318,146 A | 5/1967 | DeLeo et al. |
| 3,368,406 A | 2/1968 | Himebaugh |
| 3,512,414 A | 5/1970 | Rees |
| 4,036,054 A | 7/1977 | Goulet |
| 4,047,379 A | 9/1977 | Brookes et al. |
| 4,096,744 A | 6/1978 | DeLeo et al. |
| 4,152,938 A | 5/1979 | Danninger |
| 4,206,645 A | 6/1980 | Orcutt |
| 4,275,603 A | 6/1981 | Kalocsay |
| 4,378,696 A | 4/1983 | DeLeo et al. |
| 4,378,697 A | 4/1983 | DeLeo et al. |

(Continued)

FOREIGN PATENT DOCUMENTS

DE             1925902        12/1969

(Continued)

OTHER PUBLICATIONS

Stickney, T. M. "Total Temperature Sensors, Technical Report 5755, Revision C", Rosemount Aerospace/BFGoodrich, pp. 2-28, Jan. 1994.

(Continued)

*Primary Examiner* — Gail Verbitsky
(74) *Attorney, Agent, or Firm* — John D. Veldhuis-Kroeze; Westman, Champlin & Kelly, P.A.

(57) ABSTRACT

A total air temperature probe includes an inlet through which airflow enters a primary airflow passage through the probe. A sensor flow passage is connected to the primary flow passage. Bleed ports extend between the primary airflow passage and a cross-port which extends laterally across the probe. An aspiration aperture in the cross-port couples the cross-port to an internal cavity of a strut of the probe. The aspiration aperture can be centered within the cross-port to provide symmetrical deicing heater error behavior of the probe during changes in angle of attack. An aspiration tube couples the internal cavity of the probe to a pressure source.

16 Claims, 7 Drawing Sheets

U.S. PATENT DOCUMENTS

| | | |
|---|---|---|
| 4,403,872 A | 9/1983 | DeLeo |
| 4,458,137 A | 7/1984 | Kirkpatrick |
| 4,821,566 A | 4/1989 | Johnston et al. |
| 5,043,558 A | 8/1991 | Byles |
| 5,205,169 A | 4/1993 | Hagen |
| 5,302,026 A | 4/1994 | Phillips |
| 5,319,970 A | 6/1994 | Peterson et al. |
| 5,466,067 A | 11/1995 | Hagen et al. |
| 5,485,412 A | 1/1996 | Sarkkinen et al. |
| 5,628,565 A | 5/1997 | Hagen et al. |
| 5,653,538 A | 8/1997 | Phillips |
| 5,731,507 A | 3/1998 | Hagen et al. |
| 6,070,475 A | 6/2000 | Muehlhauser et al. |
| 6,076,963 A | 6/2000 | Menzies et al. |
| 6,370,450 B1 | 4/2002 | Kromer et al. |
| 6,452,542 B1 | 9/2002 | Bachinski et al. |
| 6,543,298 B2 | 4/2003 | Cronin et al. |
| 6,609,825 B2 | 8/2003 | Ice et al. |
| 6,622,556 B1 | 9/2003 | May |
| 6,651,515 B2 | 11/2003 | Bernard |
| D497,114 S | 10/2004 | Willcox |
| 6,817,240 B2 | 11/2004 | Collot et al. |
| 6,840,672 B2 | 1/2005 | Ice et al. |
| 6,941,805 B2 | 9/2005 | Seidel et al. |
| 6,974,250 B2 | 12/2005 | Severson |
| 7,036,365 B2 | 5/2006 | Choisnet |
| 7,114,847 B2 | 10/2006 | Simeon |
| 7,174,782 B2 | 2/2007 | Ice |
| 7,357,572 B2 | 4/2008 | Benning et al. |
| 7,416,329 B2 | 8/2008 | Severson |
| 7,441,948 B2 | 10/2008 | Bernard et al. |
| D587,610 S | 3/2009 | Benning et al. |
| 2004/0177683 A1 | 9/2004 | Ice |
| 2004/0237641 A1 | 12/2004 | Hanson et al. |

FOREIGN PATENT DOCUMENTS

| | | |
|---|---|---|
| EP | 1457765 A1 | 9/2004 |
| FR | 2808874 | 11/2001 |
| WO | 94/02814 | 2/1994 |
| WO | 0144821 A1 | 6/2001 |

OTHER PUBLICATIONS

Search Report dated Feb. 23, 2007, issued by the European Patent Office in Application No. 06251712.3.

Search Report dated Sep. 4, 2008, issued by the European Patent Office in Application No. 08251700.4.

Extended Search Report, dated Mar. 10, 2010, issued by the European Patent Office in Application No. 08251700.4.

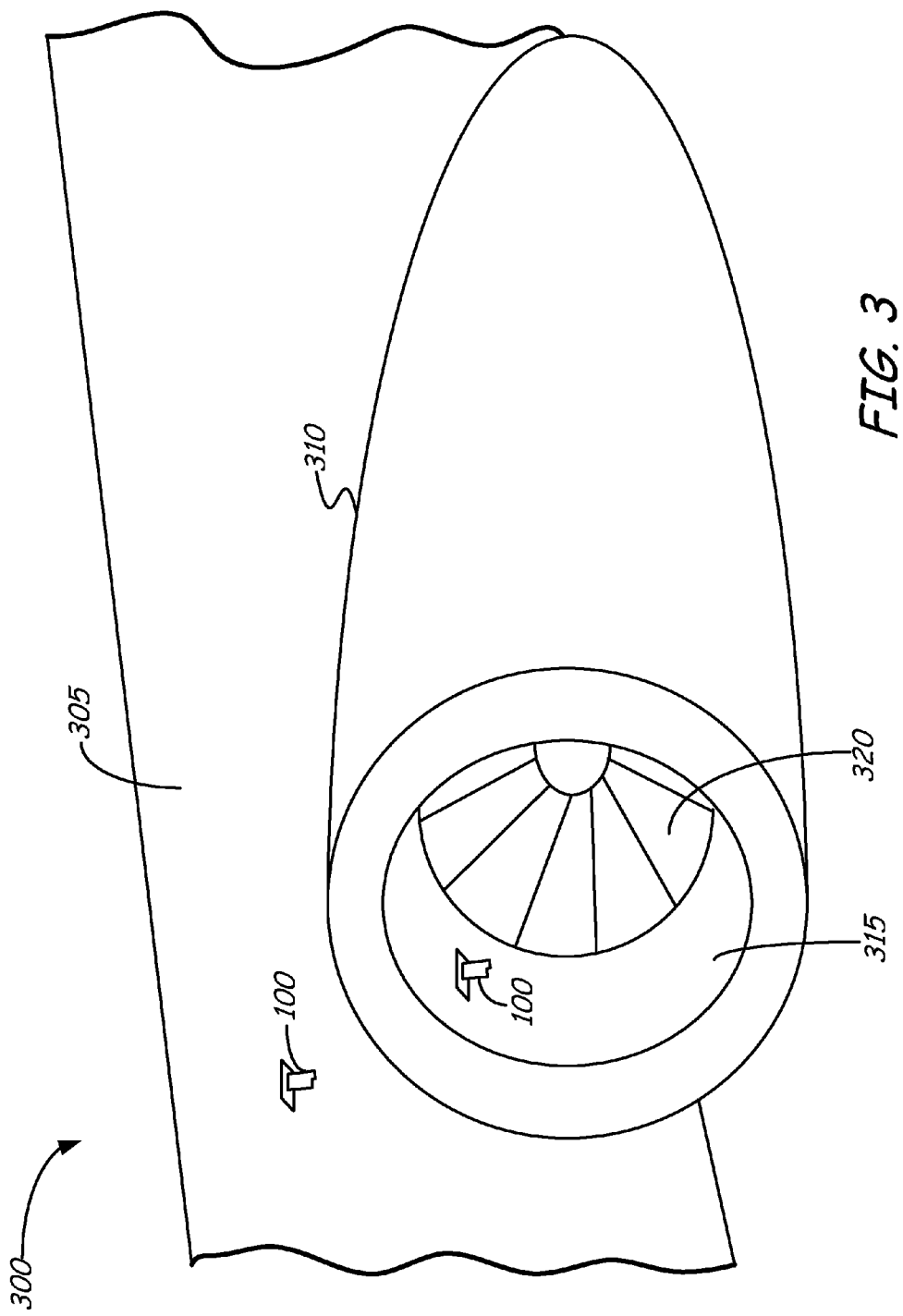

ASPIRATED ENHANCED TOTAL AIR TEMPERATURE PROBE

BACKGROUND

The present invention relates to total air temperature (TAT) probes or sensors. More particularly, the present invention relates to improving anti-icing performance and reducing deicing heater error (DHE) in TAT probes.

Modern jet powered aircraft require very accurate measurement of outside air temperature (OAT) for inputs to the air data computer, engine thrust management computer, and other airborne systems. For these aircraft types, their associated flight conditions, and the use of total air temperature probes in general, air temperature is better defined by the following four temperatures: (1) Static air temperature (SAT) or ($T_s$); (2) Total air temperature (TAT) or ($T_t$); (3) recovery temperature ($T_r$); and (4) measured temperature ($T_m$). Static air temperature (SAT) or ($T_s$) is the temperature of the undisturbed air through which the aircraft is about to fly. Total air temperature (TAT) or ($T_t$) is the maximum air temperature that can be attained by 100% conversion of the kinetic energy of the flight. The measurement of TAT is derived from the recovery temperature ($T_r$), which is the adiabatic value of local air temperature on each portion of the aircraft surface due to incomplete recovery of the kinetic energy. Recovery temperature ($T_r$) is in turn obtained from the measured temperature ($T_m$), which is the actual temperature as measured, and which differs from recovery temperature because of heat transfer effects due to imposed environments. For measuring the TAT, TAT probes are well known in the art.

Conventional TAT probes, although often remarkably efficient as a TAT sensor, sometimes face the difficulty of working in icing conditions. During flight in icing conditions, water droplets, and/or ice crystals, are ingested into the TAT probe where, under moderate to severe conditions, they can accrete around the opening of the internal sensing element. An ice ridge can grow and eventually break free—clogging the sensor temporarily and causing an error in the TAT reading. To address this problem, conventional TAT probes have incorporated an elbow, or bend, to inertially separate these particles from the airflow before they reach the sensing element.

Another phenomena which presents difficulties to some conventional TAT probe designs has to do with the problem of boundary layer separation, or "spillage", at low mass flows. Flow separation creates two problems for the accurate measurement of TAT. The first has to do with turbulence and the creation of irrecoverable losses that reduce the measured value of TAT. The second is tied to the necessity of having to heat the probe in order to prevent ice formation during icing conditions. Anti-icing performance is facilitated by heater elements embedded in the housing walls. Unfortunately, external heating also heats the internal boundary layers of air which, if not properly controlled, provide an extraneous heat source in the measurement of TAT. This type of error, commonly referred to as DHE (Deicing Heater Error), is difficult to correct for. In conventional TAT probes, the inertial flow separation bend described above has vent, or bleed, holes distributed along its inner surface. The holes are vented to a pressure equal to roughly that of the static atmospheric pressure outside of the TAT probe. In this manner, a favorable pressure difference is created which removes a portion of the boundary layer through the bleed holes, and pins the remaining boundary layer against the elbow's inner wall.

In some TAT probes, an aspiration tube is included to lower the exit pressures at the back of the probe to help draw air through the probe during on the ground, "still-air" conditions. The purpose of the aspiration tube is to cool the sensing element that has been heated by solar radiation. Although this mechanism is effective for reducing solar radiation effects while the probe is on the ground, the aspiration tube can create problems with TAT probe operation during normal flight when air is flowing past (and through) the probe.

The discussion above is merely provided for general background information and is not intended to be used as an aid in determining the scope of the claimed subject matter.

SUMMARY

A total air temperature probe includes an inlet through which airflow enters a primary airflow passage through the probe. A sensor flow passage is connected to the primary flow passage. Bleed ports extend between the primary airflow passage and a cross-port, which extends laterally across the probe, to maintain control of a boundary layer of heated air. An aspiration tube in an internal cavity of the probe aids in cooling the probe during standstill or low airflow conditions. To maintain pressure balance and thereby achieve symmetrical deicing heater error behavior of the probe during changes in angle of attack, an aspiration aperture in the cross-port can be centered in the cross-port and couples the cross-port to the internal cavity of the strut of the probe. Area ratios are also controlled to enhance performance of both swept sensor flow passage and non-swept sensor flow passage probes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1-2 is a side view of the TAT probe shown in FIG. 1-1.

FIG. 1-3 is a front view of the TAT probe shown in FIG. 1-1.

FIG. 1-4 is a rear view of the TAT probe shown in FIG. 1-1.

FIG. 2-1 is a diagrammatic side view illustration of internal features of a TAT probe in accordance with disclosed embodiments.

FIG. 2-2 is a diagrammatic side view illustration of additional features of the probe shown in FIG. 2-2.

FIG. 2-3 is a diagrammatic front view illustration of internal features of a TAT probe in which an aspiration aperture is substantially centered across the width of a cross-port of the probe.

FIG. 2-4 is a diagrammatic illustration of a sensor flow passage of a TAT probe illustrating portions of exit areas of the probe.

FIG. 3 is a diagrammatic perspective view of a TAT probe mounted to an aircraft surface in the form of an aircraft engine.

DETAILED DESCRIPTION

FIGS. 1-1 through 1-4 illustrate one example embodiment of a total air temperature (TAT) probe 100 in which mass flow through the probe is controlled by the ratios of inlet to exit pressures, as well as the ratios of aspiration aperture to exit areas. These ratios are dimensioned in order for boundary layer control to remain intact throughout the probe's operating flight envelope. Boundary control inside the TAT probe must be maintained in order to draw off heated air created by the housing heaters. Otherwise, the core air flowing to the sensing element can become contaminated with excess heat.

Figure 1:
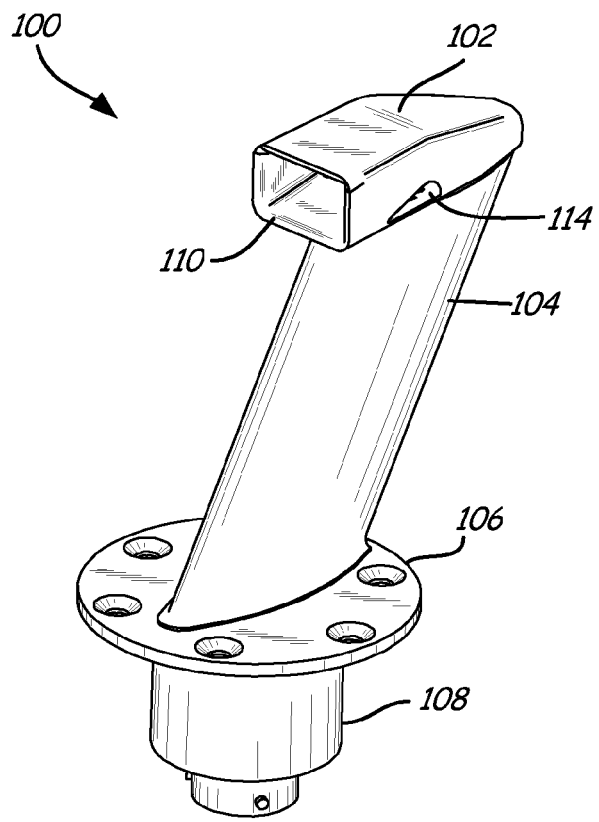
FIG. 1-1 is a perspective view of a total air temperature (TAT) probe having features which enhance operation of the probe.
Figures 1, 2:
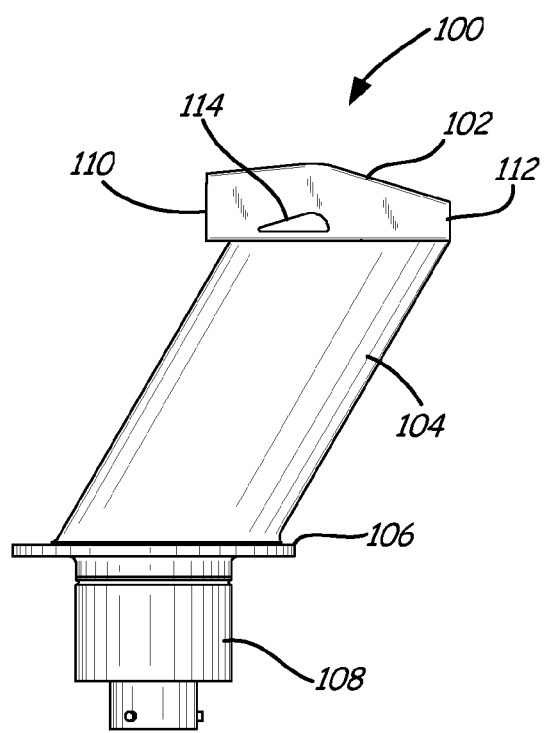
Figures 1, 2, 3:
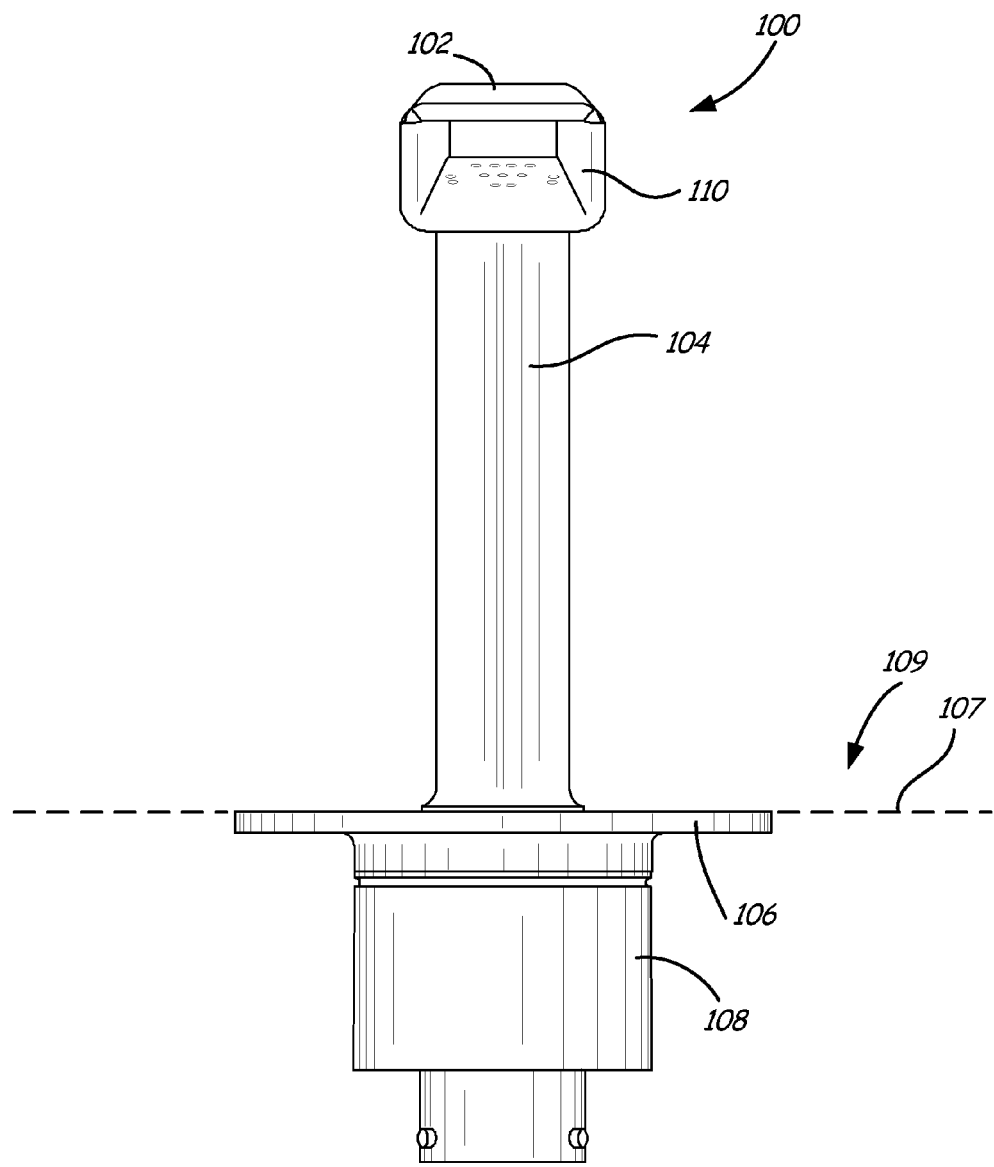
Figures 1, 2, 3, 4:
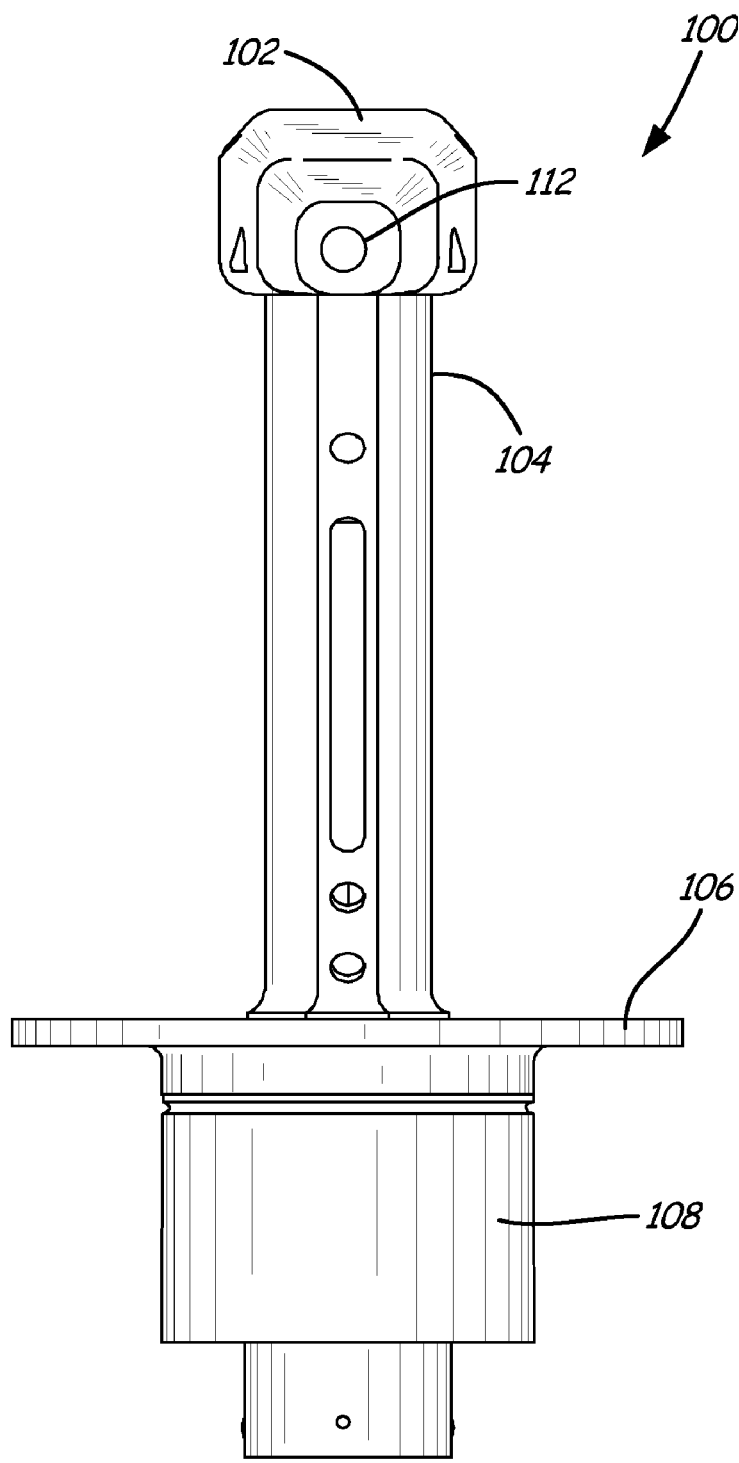
Figures 1, 2:
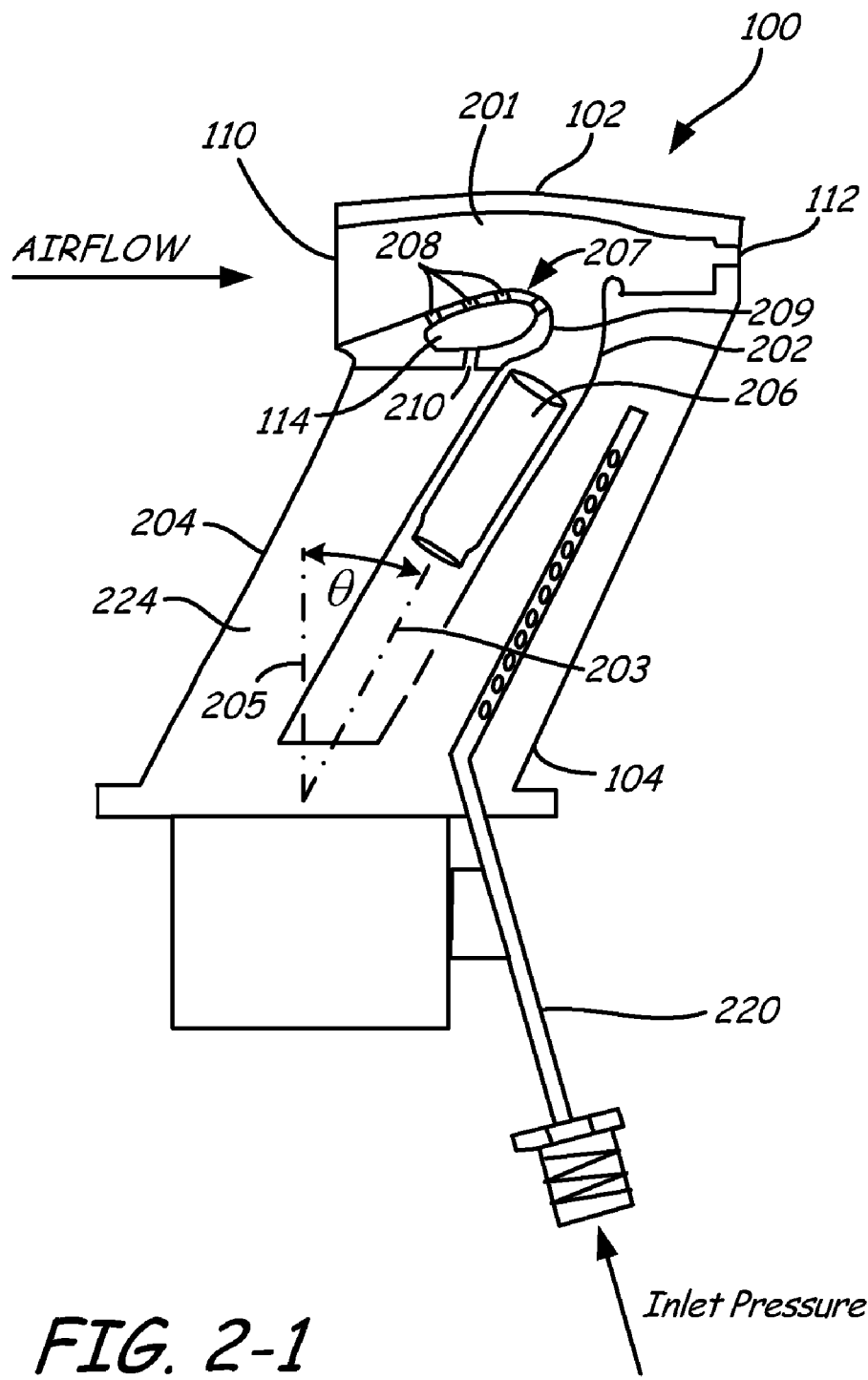
Figure 2:
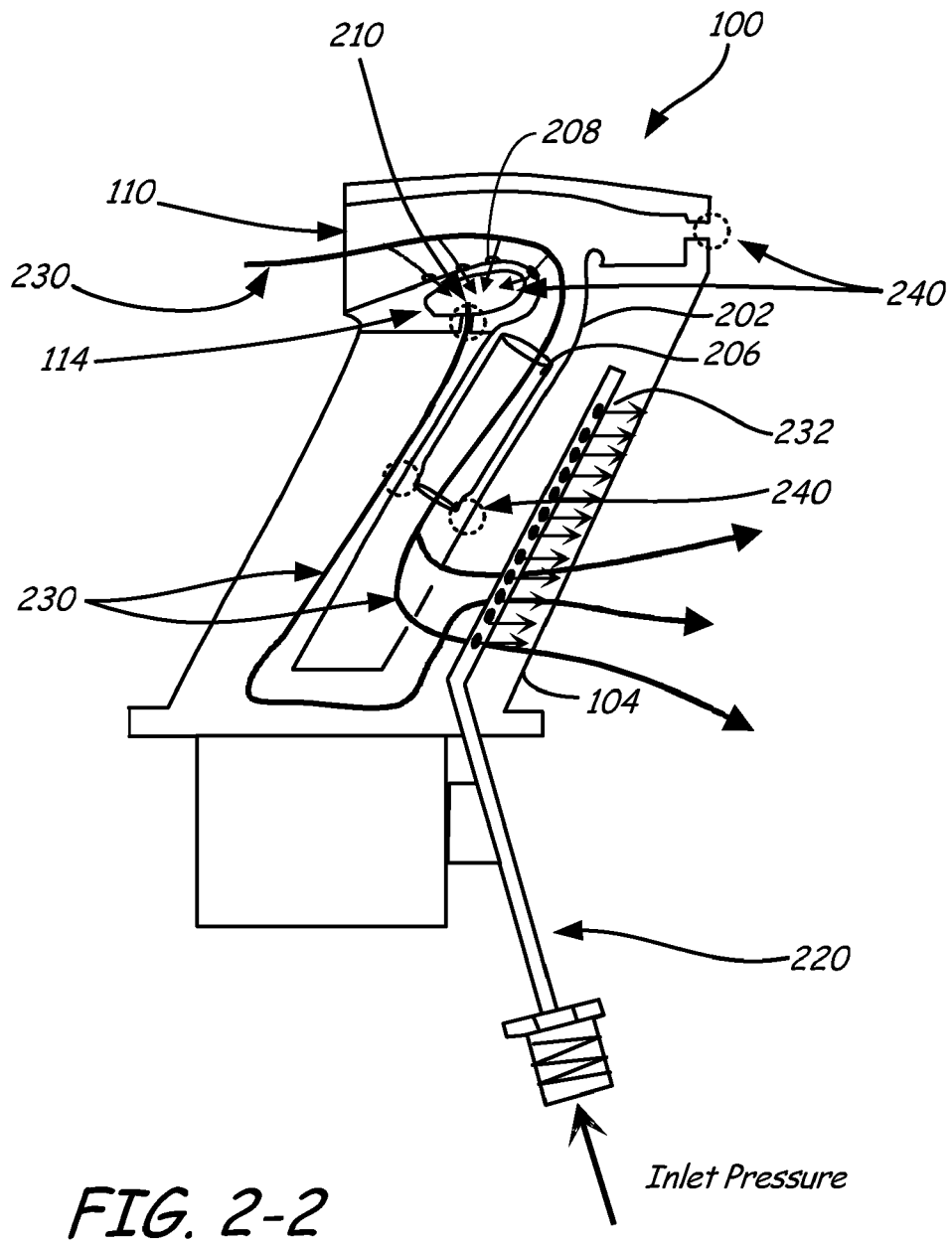
Figures 2, 3:
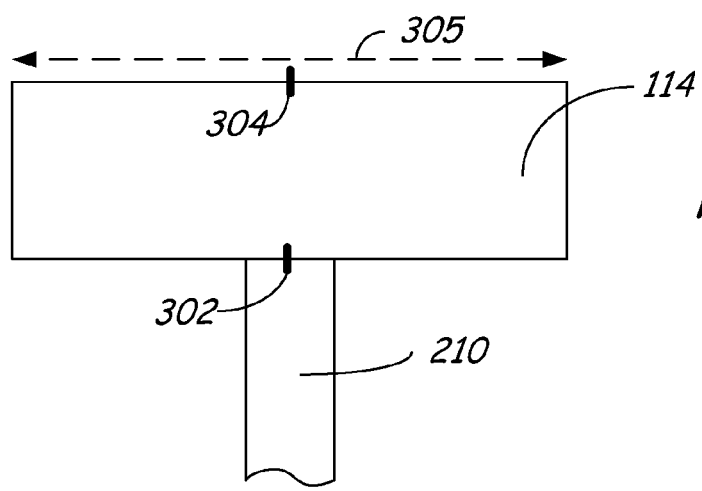
Figures 2, 3, 4:
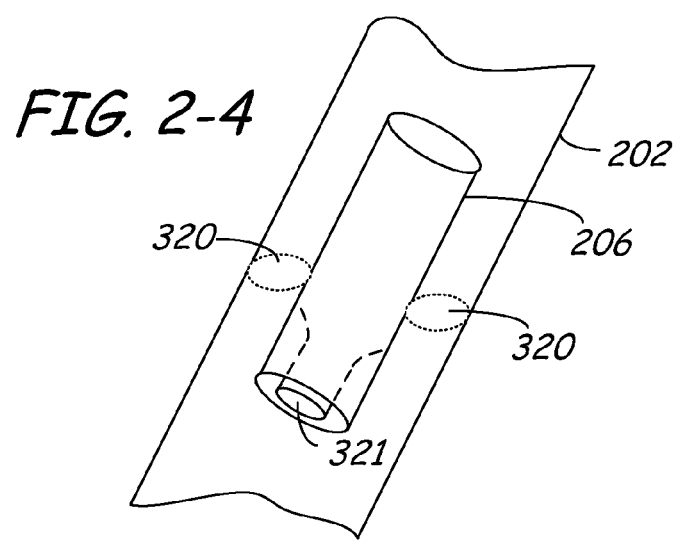

As shown in FIGS. 1-1 through 1-4, TAT probe 100 typically includes a head portion 102 and a strut portion 104. In exemplary embodiments, TAT probe 100 can also include a mounting flange 106 and an electronics housing 108. Electronics housing 108 contains electronics or electrical circuits of the type which are known to be used with conventional TAT probes for measuring the TAT. The front view shown in FIG. 1-3 illustrates the location of TAT probe 100 relative to skin 107 of an aircraft 109 in an example placement. When mounted to an aircraft 109 using mounting flange 106, the electronics housing will frequently be positioned below skin 107.

TAT probe 100 includes an inlet 110 (also referred to as an "inlet scoop") having a cross sectional area $A_{inlet}$ through which free stream airflow enters the TAT probe. Cross sectional area $A_{inlet}$ of inlet 110 is the area of inlet 110 in a plane which is generally perpendicular to the direction of the free stream airflow entering inlet 110. For illustrative purposes, in this example the cross sectional area $A_{inlet}$ of inlet 110 is best represented in front view 1-3 where the cross sectional area of inlet 110 is an area of the inlet in the plane of the page.

TAT probe 100 also includes a primary outlet port 112 through which airflow exits probe 100. As best seen in the rear view of FIG. 1-4, primary outlet port 112 has a cross sectional area in a plane which is generally perpendicular to the direction that airflow exits port 112. For illustrative purposes, in this example the cross sectional area of primary outlet port 112 can be the cross sectional area in the plane of the page. As will be described below in greater detail, the area of primary outlet port 112 is one component of an overall exit area $A^i_{exit}$ including the sums of the various exit path areas of the probe. This is described below in greater detail.

TAT probe 100 also includes a cross-port 114 which extends across the probe and functions as an external air passage to maintain a differential pressure which aids in removing a portion of the airflow and prevents spillage of the heated boundary layer as will be described later in greater detail. Cross-port 114 connects bleed holes 208 to outside static air. Cross-port 114 has a cross sectional area $A_{Cross-Port}$ which is best seen in the side view of FIG. 1-2. For illustrative purposes, in this example, the cross-sectional area $A_{Cross-Port}$ of cross-port 114 is the cross-sectional area of the cross-port in the plane of the page.

FIG. 2-1 is a diagrammatic side view illustration of internal features and components of TAT probe 100. As can be seen in FIG. 2-1, probe 100 includes a primary airflow passage 201 between airflow inlet 110 and primary outlet port 112. Also formed in TAT probe 100 is a TAT sensor flow passage 202, which receives a portion of the airflow entering the probe at inlet 110. TAT sensor flow passage 202 extends generally along a longitudinal axis 203, which in the illustrated embodiment is substantially parallel with front surface 204 of TAT probe 100, though this need not be the case. Axis 203 is formed at an angle θ against the normal 205 perpendicular to the mounting surface (e.g., skin 107 shown in FIG. 1-3). In many conventional TAT probes, angle θ is approximately zero degrees. However in swept sensor flow passage TAT probes, angle θ is greater than zero degrees, which aids in preventing ice particle impact with TAT sensor assembly 206 and significantly improving ice and water extraction and thus, providing enhanced performance in icing conditions. An example of swept sensor flow passage TAT probes is provided in U.S. Pat. No. 6,840,672 entitled TOTAL AIR TEMPERATURE PROBE PROVIDING IMPROVED ANTI-ICING PERFORMANCE AND REDUCED DEICING HEATER ERROR, which is herein incorporated by reference. In herein disclosed swept sensor flow passage embodiments, angle θ is between 5 degrees and 55 degrees, which in combination with configured area ratios as described below, have been found to provide improved performance. In disclosed embodiments, an angle θ of less than 5 degrees is considered to represent a conventional type (i.e., non-swept sensor flow passage) of TAT probe. Disclosed embodiments include conventional type and swept sensor flow passage TAT probes with features found to enhance performance.

Flow separation bend 207 of TAT probe 100 is formed with an inner elbow wall 209 which acts to divert a portion of the airflow and to provide this portion of the airflow into sensor flow passage 202 for the TAT measurement. Inner elbow wall 209 also includes bleed holes or ports 208 which connect to cross-port 114 to maintain a differential pressure which removes a portion of the airflow and prevents spillage of the heated boundary layer by keeping the heated boundary layer in close proximity to inner elbow wall 209 and thus away from TAT sensor assembly 206. This results in reduced Deicing Heater Error (DHE).

The addition of an aspiration tube 220, as depicted in FIG. 2-1, lowers the exit pressures at the back of the strut 104 via air entrainment, which in turn, helps draw air through the probe during on the ground, "still-air" conditions. The purpose of the aspiration tube is to cool the sensing element in sensor assembly 206 that has been heated by solar radiation. Although this mechanism is effective for reducing solar radiation effects while the probe is on the ground, a problem arises during normal flight operation when air is flowing past (and through) the probe. To aid in addressing this problem, an aspiration hole or aperture 210 is formed in the cross-port 114. Aspiration aperture 210 couples the cross-port 114 to the internal strut cavity 224. Aperture 210 can be formed for example, in the floor of cross-port 114. Aspiration apertures coupling the cross-port to the internal strut cavity have been used in conventional TAT probes, but it is believed that such apertures have not been used in swept sensor flow passage TAT probes. Their use with swept sensor flow passage TAT probes is herein disclosed for improved performance. In addition, enhanced geometries for conventional type TAT probes are also provided.

FIG. 2-2 illustrates entrained airflow 230 through TAT probe 100 in one example. As can be seen in FIG. 2-2, after entering inlet 110 a portion of the airflow enters sensor flow passage 202 where it either flows through or around sensor assembly 206. Another portion of the entrained airflow is drawn through the bleed ports 208 into cross-port 114. Some of this airflow then travels through aspiration aperture 210 into cavity 224 of strut 104 where it travels to various exit passageways in the probe.

Because the aspiration tube 220 continues to have pressure applied during normal flight conditions, via aspirator tube outlets 232, there is an additional reduction in pressure at the back of the strut, which is common to the sensing element exit port. Unfortunately, the pressure reduction is sufficient to create an imbalance in the air flowing past the sensing element, as well as through the bleed ports. This change in airflow can negatively impact the probe's ability to control internal boundary layers and hence, cause increased DHE.

The negative effects of the aspiration tube can be ameliorated by the introduction of the aperture or tube 210 in the floor of the cross-port 114. The cross-port 114 connects the bleed holes 208 to the outside static air, while the cross-port aspiration aperture 210 connects the cross-port to the strut cavity 224. When this aperture 210 is properly dimensioned, as defined below, it has been found that the internal pressures are re-balanced and normal DHE error performance is restored in the probe during in-flight operation. For aspirated swept sensor flow passage TAT probes (i.e., those with an angle θ of between 5 degrees and 55 degrees as defined herein), the mere inclusion of the cross-port aspiration aperture 210 aids in rebalancing internal pressures and improving DHE performance.

In a more particular embodiment, to further enhance performance, the aspiration aperture 210 is substantially centered within the cross-port 114 to insure symmetrical DHE behavior of the probe during changes of angle of attack (AOA) of the aircraft. This can be seen in an example illustration provided in FIG. 2-3.

In FIG. 2-3 cross-port 114 is shown diagrammatically from a front view perspective. The particular shape used in FIG. 2-3 to illustrate cross-port 114 and aspiration aperture 210 is purely for illustrative purposes, and does not limit the shapes of these features to those shown. Many other shapes can be used within the scope of disclosed embodiments. In this case, dimension line 305 represents a width of the cross-port across the probe (e.g., between sides of the probe). Thus, this diagrammatic illustration of cross-port 114 is representative of a front view such as the one shown in FIG. 1-3. As can be seen in FIG. 2-3, aperture 210 is centered across the width 305 of cross-port 114. As defined here, aspiration aperture 210 is substantially centered within cross-port 114 when the center 302 (represented in FIG. 2-3 by a center mark) of the cross-port 114 is positioned within fifteen percent of the center 304 (represented in FIG. 2-3 by a center mark) of the width 305 of the cross-port. In other words, the aspiration aperture is substantially centered within the cross-port when any offset between the center 302 of the aspiration aperture and center 304 of the width of the cross-port is less than or equal to fifteen percent of the total width 305.

In some more particular swept sensor flow passage embodiments, the DHE performance is optimized by controlling the ratios of dimensions or areas of the probe. For example, it has been found that performance is enhanced when the area $A_{aspiration}$ of the aperture 210 falls within a prescribed minimum and maximum range as characterized in Equation 1:

$$K_1 \frac{\sum_i A^i_{exit}}{A_{inlet}} \leq \frac{A_{aspiration}}{A_{inlet}} \leq K_2 \frac{\sum_i A^i_{exit}}{A_{inlet}} \quad \text{Equation 1}$$

where, $K_1$ is a constant;

$K_2$ is a constant;

$K_1 < K_2$;

$A_{inlet}$ is the area of inlet 110; and $A^i_{exit}$ is the sum of exit areas 240 (shown in FIG. 2-2) on the probe as defined below.

The various exit areas which combine to define $A^i_{exit}$ are the area of primary outlet port 112, the sum of the areas of the bleed holes 208, the areas 320 (shown in FIG. 2-5) between sensor assembly 206 and the walls of sensor flow passage 202, and the exit area 321 (shown in FIG. 2-4) of the sensor assembly 206. In some embodiments, exit area 321 can also represent the sum of all airflow exits from the sensor assembly. Of course, Equation 1 can be rewritten to eliminate the inlet area $A_{inlet}$ as shown in Equation 2:

$$K_1 \sum_i A^i_{exit} \leq A_{aspiration} \leq K_2 \sum_i A^i_{exit} \quad \text{Equation 2}$$

In still more particular swept sensor flow passage embodiments which have been found to exhibit enhanced performance, the relationship of Equations 1 and 2 is further defined by the values of $K_1$ and $K_2$ shown in Equations 3 and 4:

$$K_1 = \frac{1}{6.0} \quad \text{Equation 3}$$

$$K_2 = \frac{1}{3.5} \quad \text{Equation 4}$$

In still other swept sensor flow passage embodiments, the DHE performance is optimized by controlling the ratios of dimensions or areas of the probe such that the area $A_{aspiration}$ of aperture 210 falls within a prescribed minimum and maximum range as characterized in Equation 5:

$$H_1 A_{Cross-Port} \leq A_{aspiration} \leq H_2 A_{Cross-Port} \quad \text{Equation 5}$$

where $H_1$ is a constant;

$H_2$ is a constant;

$H_1 < H_2$; and $A_{Cross-Port}$ is the area of cross-port 114.

In still more particular swept sensor flow passage embodiments which have been found to exhibit enhanced performance, the relationship of Equation 5 is further defined by the values of $H_1$ and $H_2$ shown in Equations 6 and 7:

$$H_1 = \frac{1}{8.0} \quad \text{Equation 6}$$

$$H_2 = \frac{1}{3.5} \quad \text{Equation 7}$$

Referring now to non-swept sensor flow passage configurations (i.e., embodiments in which θ is less than 5 degrees), in which the aspiration aperture 210 is centered within cross-port 114, the DHE performance can likewise be optimized by controlling the ratios of dimensions or areas of the probe. For example, for these probe types, it has been found that performance is enhanced when the area $A_{aspiration}$ of the aperture 210 falls within a prescribed minimum and maximum range as characterized in Equations 1 and 2 (Equation 2 repeated here as Equation 8):

$$K_1 \sum_i A^i_{exit} \leq A_{aspiration} \leq K_2 \sum_i A^i_{exit} \quad \text{Equation 8}$$

where, $K_1 < K_2$

In still more particular non-swept sensor flow passage embodiments which have been found to exhibit enhanced performance, the relationship of Equation 8 is further defined by the values of $K_1$ and $K_2$ shown in Equations 9 and 10:

$$K_1 = \frac{1}{7.0} \qquad \text{Equation 9}$$

$$K_2 = \frac{1}{4.3} \qquad \text{Equation 10}$$

In these same non-swept sensor flow passage embodiments, further optimization of DHE performance is achieved by controlling the ratios of dimensions or areas of the probe such that the area $A_{aspiration}$ of aperture 210 also falls within a prescribed minimum and maximum range as characterized in Equation 5 (repeated here as Equation 11):

$$H_1 A_{Cross\text{-}Port} \leq A_{aspiration} \leq H_2 A_{Cross\text{-}Port} \qquad \text{Equation 11}$$

where,
$H_1 < H_2$.

In still more particular non-swept sensor flow passage embodiments which have been found to exhibit enhanced performance, the relationship of Equation 11 is further defined by the values of $H_1$ and $H_2$ shown in Equations 12 and 13:

$$H_1 = \frac{1}{3.5} \qquad \text{Equation 12}$$

$$H_2 = \frac{1}{2.5} \qquad \text{Equation 13}$$

FIG. 3 is a diagrammatic perspective view of a portion of an aircraft 300 on which TAT probes 100 of disclosed embodiments are mounted. As shown in FIG. 3, aircraft 300 includes a fuselage 305 and an aircraft engine 310. A first TAT probe 100 is mounted on a surface or skin of fuselage 305, while a second TAT probe is mounted on a surface 315 of engine 310. Surface 315 forms part of the inlet portion of engine 310, upstream of fan blades 320. However, other aircraft engine surfaces can also be used. Of course, disclosed embodiments are not limited to TAT probes mounted to surfaces of aircraft engines, or to the particular fuselage position illustrated, but instead apply more generally to TAT probes mounted to any aircraft surfaces for purposes of measuring TAT.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A total air temperature probe comprising:
   an airflow inlet;
   a primary airflow passage through the probe;
   a sensor flow passage connected to the primary airflow passage, wherein the sensor flow passage is oriented at an angle θ of less than five degrees relative to a normal perpendicular to a mounting surface of the probe;
   a cross-port extending laterally across the probe;
   a plurality of bleed ports between the primary airflow passage and the cross-port;
   an aspiration aperture in the cross-port coupling the cross-port to an internal cavity of a strut of the probe, wherein the aspiration aperture is substantially centered within the cross-port to provide symmetrical deicing heater error behavior of the probe during changes in angle of attack;
   an aspiration tube coupling the internal cavity of the probe to a pressure source;
   wherein the aspiration aperture in the cross-port is dimensioned such that an area $A_{aspiration}$ of the aspiration aperture falls within a prescribed minimum and maximum range as characterized by the relationship:

$$K_1 \sum_i A^i_{exit} \leq A_{aspiration} \leq K_2 \sum_i A^i_{exit}$$

where,
$K_1 < K_2$; and
$A^i_{exit}$ is the sum of exit areas on the probe.

2. The total air temperature probe of claim 1, wherein $K_1$ and $K_2$ are defined by the relationships:

$$K_1 = \frac{1}{7.0}; \text{ and}$$

$$K_2 = \frac{1}{4.3}.$$

3. The total air temperature probe of claim 2, wherein $A^i_{exit}$ is the sum of an area of a primary outlet port of the primary airflow passage through the probe, areas of the plurality of bleed ports, areas between a sensor assembly and walls of the sensor flow passage, and exit areas of the sensor assembly.

4. The total air temperature probe of claim 1, wherein the aspiration aperture in the cross-port is also dimensioned such that the area $A_{aspiration}$ of the aspiration aperture also falls within a prescribed minimum and maximum range as characterized by the relationship:

$$H_1 A_{Cross\text{-}Port} \leq A_{aspiration} \leq H_2 A_{Cross\text{-}Port}$$

where,
$H_1 < H_2$; and
$A_{Cross\text{-}Port}$ is an area of an opening of the cross-port.

5. The total air temperature probe of claim 4, wherein $H_1$ and $H_2$ are defined by the relationships:

$$H_1 = \frac{1}{3.5}; \text{ and}$$

$$H_2 = \frac{1}{2.5}.$$

6. A total air temperature probe comprising:
   an airflow inlet;
   a primary airflow passage through the probe;
   a sensor flow passage connected to the primary airflow passage, wherein the sensor flow passage is oriented at an angle θ of less than five degrees relative to a normal perpendicular to a mounting surface of the probe;
   a cross-port extending laterally across the probe;
   a plurality of bleed ports between the primary airflow passage and the cross-port;
   an aspiration aperture in the cross-port coupling the cross-port to an internal cavity of a strut of the probe, wherein the aspiration aperture is substantially centered within the cross-port to provide symmetrical deicing heater error behavior of the probe during changes in angle of attack;

an aspiration tube coupling the internal cavity of the probe to a pressure source; and wherein the aspiration aperture in the cross-port is dimensioned such that an area $A_{aspiration}$ of the aspiration aperture falls within a prescribed minimum and maximum range as characterized by the relationship:

$$K_1 \sum_i A_{exit}^i \leq A_{aspiration} \leq K_2 \sum_i A_{exit}^i$$

where
$K_1 < K_2$; and
$A_{exit}^i$ is the sum of exit areas on the probe.

7. The total air temperature probe of claim 6, wherein $K_1$ and $K_2$ are defined by the relationships:

$$K_1 = \frac{1}{7.0}; \text{ and}$$

$$K_2 = \frac{1}{4.3}.$$

8. The total air temperature probe of claim 7, wherein $A_{exit}^i$ is the sum of an area of a primary outlet port of the primary airflow passage through the probe, areas of the plurality of bleed ports, areas between a sensor assembly and walls of the sensor flow passage, and exit areas of the sensor assembly.

9. The total air temperature probe of claim 6, wherein the aspiration aperture in the cross-port is also dimensioned such that the area $A_{aspiration}$ of the aspiration aperture also falls within a prescribed minimum and maximum range as characterized by the relationship:

$$H_1 A_{Cross-Port} \leq A_{aspiration} \leq H_2 A_{Cross-Port}$$

where,
$H_1 < H_2$; and
$A_{Cross-Port}$ is an area of an opening of the cross-port.

10. The total air temperature probe of claim 9, wherein $H_1$ and $H_2$ are defined by the relationships:

$$H_1 = \frac{1}{3.5}; \text{ and}$$

$$H_2 = \frac{1}{2.5}.$$

11. A total air temperature probe comprising:
an airflow inlet;
a primary airflow passage through the probe;
a sensor flow passage connected to the primary airflow passage, wherein the sensor flow passage is oriented at an angle θ of less than five degrees relative to a normal perpendicular to a mounting surface of the probe;
a cross-port extending laterally across the probe;
a plurality of bleed ports between the primary airflow passage and the cross-port;
an aspiration aperture in the cross-port coupling the cross-port to an internal cavity of a strut of the probe;
an aspiration tube coupling the internal cavity of the probe to a pressure source; and
wherein the aspiration aperture in the cross-port is dimensioned such that an area $A_{aspiration}$ of the aspiration aperture falls within a prescribed minimum and maximum range as characterized by the relationship:

$$K_1 \sum_i A_{exit}^i \leq A_{aspiration} \leq K_2 \sum_i A_{exit}^i$$

where,
$K_1 < K_2$; and
$A_{exit}^i$ is the sum of exit areas on the probe.

12. The total air temperature probe of claim 11, wherein $K_1$ and $K_2$ are defined by the relationships:

$$K_1 = \frac{1}{7.0}; \text{ and}$$

$$K_2 = \frac{1}{4.3}.$$

13. The total air temperature probe of claim 12, wherein $A_{exit}^i$ is the sum of an area of a primary outlet port of the primary airflow passage through the probe, areas of the plurality of bleed ports, areas between a sensor assembly and walls of the sensor flow passage, and exit areas of the sensor assembly.

14. The total air temperature probe of claim 11, wherein the aspiration aperture in the cross-port is also dimensioned such that the area $A_{aspiration}$ of the aspiration aperture also falls within a prescribed minimum and maximum range as characterized by the relationship:

$$H_1 A_{Cross-Port} \leq A_{aspiration} \leq H_2 A_{Cross-Port}$$

where,
$H_1 < H_2$; and
$A_{Cross-Port}$ is an area of an opening of the cross-port.

15. The total air temperature probe of claim 14, wherein $H_1$ and $H_2$ are defined by the relationships:

$$H_1 = \frac{1}{3.5}; \text{ and}$$

$$H_2 = \frac{1}{2.5}.$$

16. The total air temperature probe of claim 11, wherein the aspiration aperture is substantially centered within the cross-port to provide symmetrical deicing heater error behavior of the probe during changes in angle of attack.

* * * * *